July 14, 1953     J. S. BOZEK ET AL     2,645,399
MACHINE FOR APPLYING AND SEALING CLOSURES TO BOTTLES
Filed May 11, 1951     9 Sheets-Sheet 1

Fig. 1.

INVENTORS,
JOHN S. BOZEK.
HERMANN E. WEIDANZ.
BY Joseph B. Lindecker
ATTORNEY

Fig. 3.

July 14, 1953  J. S. BOZEK ET AL  2,645,399
MACHINE FOR APPLYING AND SEALING CLOSURES TO BOTTLES
Filed May 11, 1951  9 Sheets-Sheet 8

INVENTORS.
JOHN S. BOZEK.
BY HERMANN E. WEIDANZ.

Joseph B. Lindecker
ATTORNEY

July 14, 1953     J. S. BOZEK ET AL     2,645,399
MACHINE FOR APPLYING AND SEALING CLOSURES TO BOTTLES
Filed May 11, 1951     9 Sheets-Sheet 9

INVENTORS.
JOHN S. BOZEK.
HERMANN E. WEIDANZ.
BY Joseph B. Lindecker
ATTORNEY

UNITED STATES PATENT OFFICE 2,645,399

MACHINE FOR APPLYING AND SEALING CLOSURES TO BOTTLES

John S. Bozek, Franklin Park, and Hermann E. Weidanz, Chicago, Ill., assignors to Standard Packaging Corporation, Chicago, Ill., a corporation of Virginia Application May 11, 1951, Serial No. 225,782

12 Claims. (Cl. 226—86)

This invention relates to new and useful improvements in feeding mechanisms for container handling apparatus and, more particularly, to a feeding mechanism for delivering filled bottles continuously and in succession one after the other in proper spaced relation for the sealing operations of a rotary bottle closure sealing machine.

Bottles to be sealed are usually delivered to a closure sealing machine by a continuously moving straight line conveyor moving from the bottle filling machine and which conveyor carries the bottles toward a rotary infeed star wheel on the sealing machine. When a bottle is directly adjacent the infeed star wheel, the movement of the conveyor will carry it into the star wheel pocket which next sweeps across the conveyor. The path of the bottle is generally along a straight line until it is in a star wheel pocket, and it then moves along a curved path. The conveyor and star wheel have heretofore been driven from the same source at fixed speed ratios, and relying that the degree of friction between the bottles and the conveyor will remain constant.

It is highly important that the closure sealing machine shall not mar or damage the bottles handled thereby, and the area adjacent that at which the above mentioned transfer occurs is one at which bottles are most apt to be damaged. More particularly, in sweeping across the conveyor, the star wheel may rather forcibly engage a bottle if the latter is not moving at a speed closely approximating the star wheel speed or is not at the proper point for engagement by the star wheel, and the bottle may be sharply moved against the guide elements which cooperate with the conveyor and star wheel. Also, under such circumstances, the container may even become momentarily jammed between the star wheel and the guide elements.

In order that bottles may be delivered to the star wheel in properly spaced arrangement to be synchronized therewith, it has been the usual practice to provide a gate or timing device on the conveyor and adjacent the star wheel. These timing devices have been controlled from the star wheel in such a manner that the bottles would be released for movement to the star wheel in properly spaced order. The distance of the gate device from the star wheel has usually been varied according to the size of the bottles being handled. The delivery of the bottles from said gate device to said star wheel has always depended upon the movement of the conveyor, if the degree of friction between the bottles and the conveyor was held constant, the bottles would arrive at the star wheel at the proper time; however, when the conveyor is wet with water or milk which has been spilled thereon, the bottles travel at a slower rate and arrive too late at the star wheel and are broken by said star wheel as it turns upon its power shaft. The use of such gate device has also contributed to the marring of bottles due to the fact that when the leading bottle is released by the gate, the following contacting bottles move sharply forward with the conveyor, and their movement is then suddenly stopped by the gate, causing the line of bottles to be sharply jarred. Since the force of any such impact increases as the square of the bottle velocity, this cause of impact is increasingly important in connection with the trend toward closure sealing machines of higher output which require rapid movement of all the bottle handling devices, including the infeed conveyor.

Generally speaking, the above difficulties are due to the fact that bottles move at random upon the straight line conveyor and, during the latter portion of their movement thereon, are in contact so that their axes are spaced apart a distance equal to their overall diameters. However, the infeed star wheel is designed to handle them in a more widely spaced arrangement, which spacing is determined by the spacing between the sealing heads on the closure sealing machine. Use of a timing device has heretofore been customary to obtain such spacing, but had the stated objection of jarring the bottles.

Another point to be noted in connection with closure sealing machines is the following: In order to enable a sealer to handle bottles of different sizes, a purchaser is provided with a different infeed star wheel for each size, each star wheel having a different outside diameter and pockets of slightly different conformation. It is also to be noted that the star wheels for each size bottle are so designed that the vertical axes of all bottles, regardless of size, will move along the same curved path. That is, the infeed star wheels for all size bottles have the same pitch circle. It is necessary to keep this pitch circle fixed because the vertical axes of the vertically reciprocable sealing heads of sealing machine are positioned on the pitch circles of their rotary carriers. Therefore, an infeed star wheel intended for large bottles will have deeper pockets than a star wheel intended for smaller bottles and the guide elements surrounding the respective star wheels will be so positioned for each size bottle that they will guide bottles along exactly the same curved line. Also, as has been generally stated above, because the circumferential spacing of the sealing heads is fixed, the axes of all bottles must be kept apart fixed distances by the various sized infeed star wheels.

In any event, and even with the above changes for bottles of different sizes, and also with the use of a timing device adjustable for size, it is frequently found that a sealing machine will damage bottles of one size to a much greater extent than it damages bottles of another size. In other words, even though machines have heretofore been designed which would operate very smoothly and quietly with bottles of one size, the same machine would be quite noisy when handling bottles of another size and would badly mar such bottles.

An important object of the present invention is to provide an arrangement for smoothly transferring bottles from a conveyor on which they move at random to a moving element adapted to handle them is spaced relation.

A further object of the invention is to provide a mechanism of the above type which does not require use of gate type timing device.

Another object of the invention is to provide a mechanism of the above construction which will satisfactorily and smoothly handle bottles of various sizes.

A still further object of the invention is to provide a feeding mechanism which is adapted to receive filled bottles promiscuously; said mechanism for momentarily retarding advancing movement of the filled bottles on a continuously moving conveyor, and to properly space the same for the sealing operations of the closure applying and sealing machine.

A still further object of the invention is the provision of a conveying system including a continuously rotating timing screw which is so formed, that, in conjunction with a continuously moving horizontal conveyor, it will operate to move the bottles to the star wheel at a desired rate irrespective of the degree of friction between the bottles and the conveyor, it will also operate to gradually increase the spaced relation between bottles that are being delivered to the star wheel by the conveyor in a positive manner and without danger of injuring the bottles being conveyed or spilling any contents thereof.

A still further object of the invention is the provision of a conveying system including a moving conveyor, a continuously rotating timing screw, and means positioned adjacent said screw cooperating with said timing screw, said means being so constructed as to exert a varying pressure against the bottle simultaneously at a plurality of points, whereby the bottle may be retarded or advanced or otherwise moved into proper position relative to said timing screw without any quick or abrupt movement of the bottle, and said means for protecting bottles against damage, if in accidentally overturned position alongside said timing screw on said moving conveyor.

Other objects and advantages of the invention will become apparent from or will be pointed out in the following specification which is directed particularly to an illustrative embodiment of the invention, as shown in the accompanying drawings in which:

The bottle closure applying and sealing machine illustrated in the drawings is a self-contained machine comprising a closure chute, a closure applying station and a plurality of closure sealing heads. Said machine is here shown with a new and novel moving conveyor, a novel timing screw, and a novel movable guide comprising a chamber embodying a plurality of resilient members for exerting a varying pressure against each bottle simultaneously at a plurality of points to cooperate with the timing screw for delivering the bottles to said closure applying and sealing machine. The closure applying and sealing machine itself has been shown in Design Patent No. 162,919, issued April 10, 1951, and shown and described in patent application Serial No. 140,086 filed January 23, 1950, said patent and application owned by the assignee of this application.

The bottle closures employed for sealing the bottles pass to a vertical slide where they remain in a position for delivery to bottles at the closure applying station where one closure at a time is automatically placed on the top of a filled bottle moving past beneath the closure. The filled bottle with a closure resting over its mouth portion moves on to one of a plurality of pedestals which move continuously in a circular direction. During this rotation the pedestal rises, causing the capped bottle to come in contact with closure sealing means after which said sealed bottle is conveyed to the bottle discharge wheel where it is passed to a moving conveyor for delivery. All the operations, including the closure withdrawing means, are automatic and interrelated by means of the common drive means.

In the embodiment of the invention illustrated in the drawings, the closure applying and sealing machine 10 comprises a main housing 11 with adjustable leg members 12. Supported within said housing 11 is a motor 14 equipped with a special shaft 13 and extension 15, which drives a shaft 19 assembled to a vacuum pump 16 by means of a pair of spur gears 17 and 18. The opposite end of shaft 13 is provided with a "Reeves" adjustable speed pulley 20 which drives a belt 21, said belt 21 driving a pulley 22 pressed upon a drive shaft 23. A reduction spur gear 24 is secured to said drive shaft 23 and by the rotation thereof it drives a reduction gear 25 supported on one end of a worm shaft 26. Said worm shaft 26 has a spur gear 27 mounted on its end opposite from its end supporting said gear 25; said worm shaft 26 further supporting a worm 28 intermediate its end. Said worm shaft 26 and worm 28 drive a worm gear 29 mounted horizontally upon a vertical main shaft 30, which supports the horizontal pedestal carrier 31 and capping head bracket 32 with related parts.

Power is transmitted from shaft 26 to the main worm shaft 34 by the use of three spur gears 27, 36, and 37, said shaft 37 being mounted on said shaft 34 and said spur gear 36 being positioned between said gears 27 and 37. Said shaft 34 has two worms 38 and 39 mounted thereon for driving two worm gears 40 and 41 mounted on vertical shafts 42 and 43 which support the two star wheels, inlet star wheel 44 and outlet star wheel 45. The main worm shaft 34 has a bevel gear 46 pressed onto one of its free ends, said gear 46 in mesh with a bevel gear 47 pressed on one end of the conveyor drive shaft 48. The opposite end of shaft 48 has a bevel gear 49 pressed thereon which is in mesh with the bevel gear 50 mounted on one end of conveyor shaft 51 which has a sprocket 52 mounted thereon for driving the conveyor 53.

Power is transmitted from shaft 34 to the cap feeder shaft 55 by the use of two bevel gears 56 and 57, said bevel gear 56 being mounted upon shaft 34 between worms 38 and 39, said bevel gear 57 being mounted upon one end of cap feeder shaft 55 and in mesh with said bevel gear 56.

Figure 1:
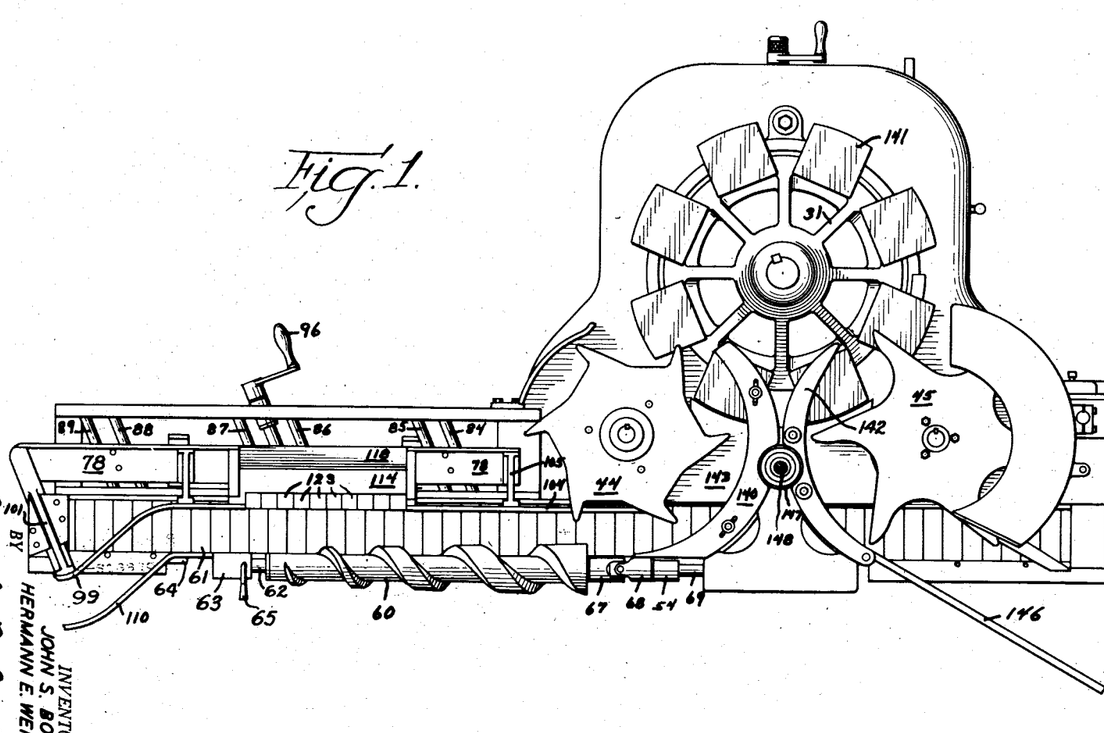
Figure 1 is a top plan view of a machine comprising the preferred embodiment of the container handling apparatus, and the sealing head; the closure applying mechanism being removed.
Figure 2:
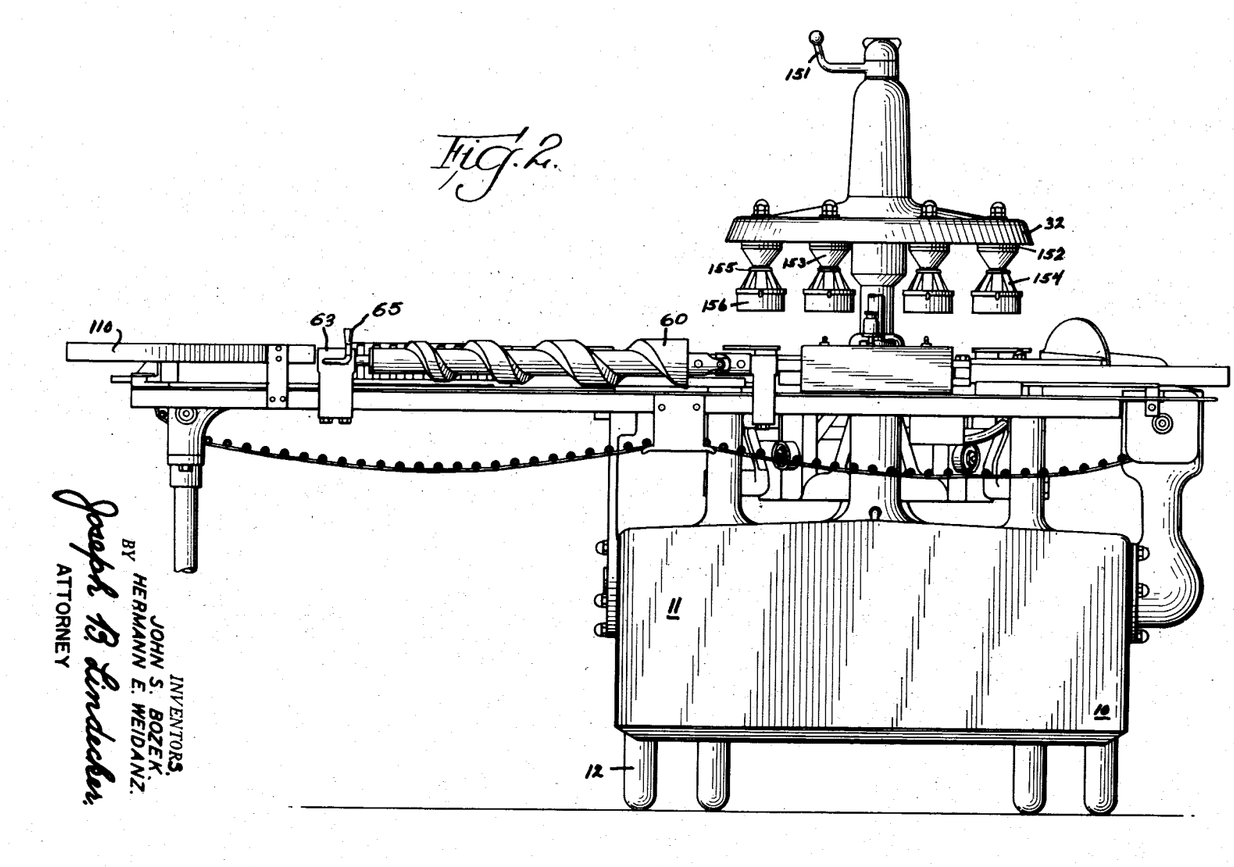
Figure 2 is a front elevational view of the machine shown in Figure 1.
Figure 3:
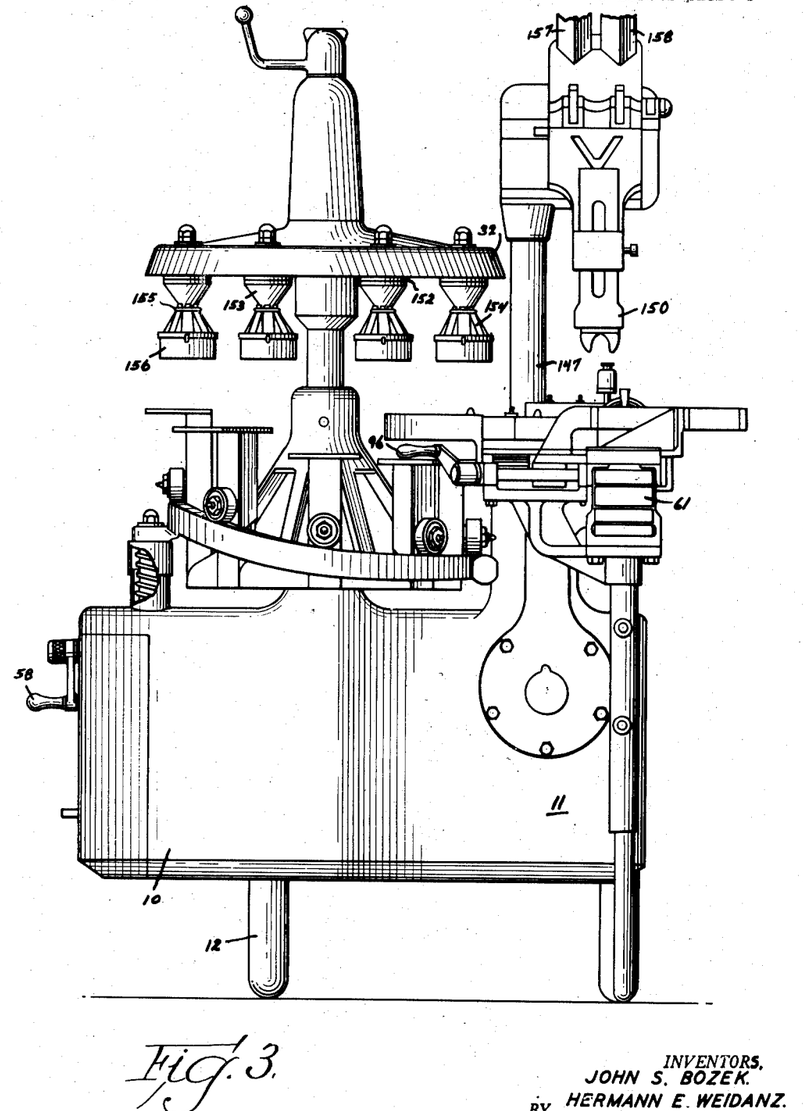
Figure 3 is a left side view of the machine shown in Figures 1 and 2, and with the closure applying mechanism added.
Figure 4:
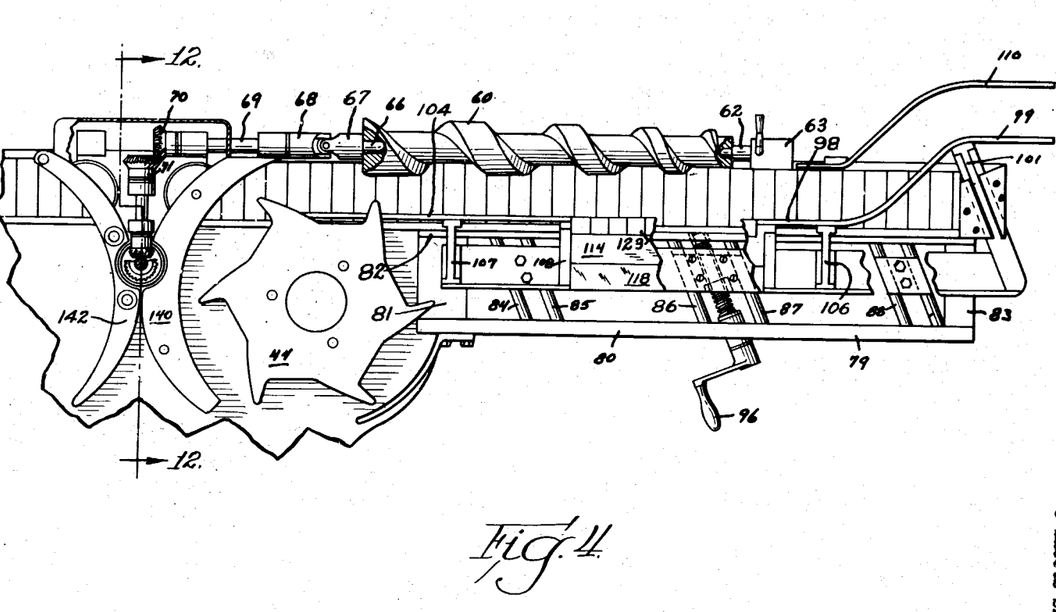
Figure 4 is a fragmentary top plan view similar to Figure 1 with parts removed and showing the driving mechanism for the timing screw.

The bottle timing device consists in part of a screw 60 placed at one side of the conveyor 53 as clearly shown by Figures 1, 2, and 4. Said timing screw 60 serves a purpose well known in the art, namely, that of intercepting filled bottles fed onto the conveyor 53 and equidistantly spacing them for conveying engagement by the conveyor links 61. The screw 60 has a removable and slidable trunnion bearing 62 mounted in the bearing housing 63 which is rigidly secured upon the infeed conveyor table 64; said bearing 62 provided with a handle 65 which travels in a suitable slot having horizontal and vertical portions whereby said bearing 62 can be removed from the end of screw 60 when said screw is to be removed or exchanged for a screw with a different pitch as required for use with bottles of another size.

The screw is mounted at its delivery end upon a trunnion bearing 66 connected to a member 67 forming a part of a universal joint consisting of two pivotally connected parts 67 and 68, said portion 68 secured to one end of the screw drive shaft 69. Said shaft 69 is supported by bearing 54 and is driven by a bevel gear 70 pressed upon its forward end, said gear 70 is in mesh with a bevel gear 71 mounted upon one end of an intermediate drive shaft 72. Said shaft 72 is provided with a bevel gear 73 mounted upon its opposite end, and said gear 73 is arranged in mesh with a bevel gear 74 mounted upon the cap feeder shaft 55. Shaft 55 is driven, as described above, by the main worm shaft 34.

Figure 5:
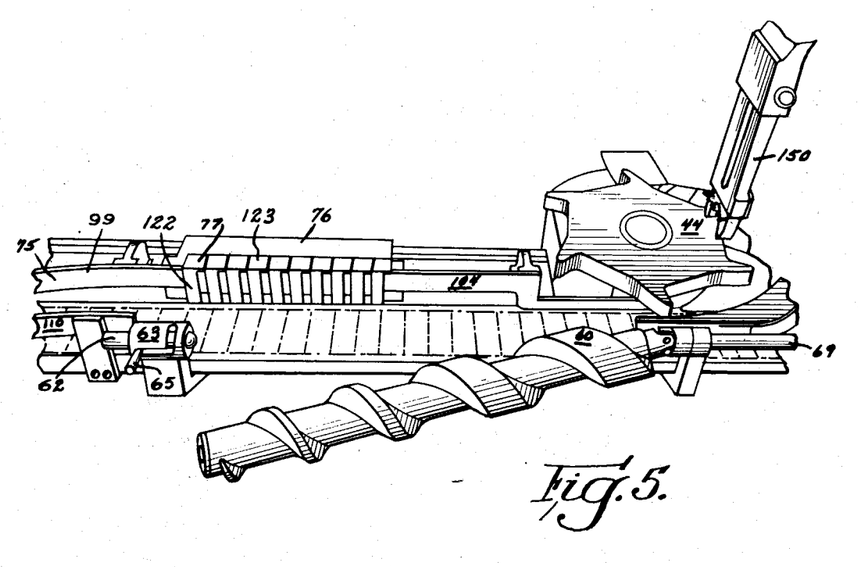
Figure 5 is a fragmentary perspective plan view of the container handling apparatus with the timing screw partially removed from its normal position upon the machine.

Cooperating with the bottle timing screw 60 for placing the bottle in proper relation to the star wheel 44 is a bottle guide assembly 75, said assembly consisting of two movable guide bars 99 and 104 and an enclosed chamber 76 constructed with a series of ten independent members 77 which exert a varying pressure against every bottle simultaneously at a plurality of points whereby the bottle may be retarded or advanced or otherwise moved into proper position relative to said timing screw without any quick or abrupt movement of the bottle. Said chamber 76 is rigidly supported upon a horizontal rectangular plate member 78 which is movably mounted upon a rigid rectangular frame 79 composed of four frame members 80, 81, 82, 83 and six angularly arranged horizontal rods 84, 85, 86, 87, 88, and 89, said rods 84 through 89 disposed at an angle with regard to frame members 80 through 83. Said rods 84 through 89 serve as a plurality of slide bars for three bearing members attached on the bottom of plate 78; each bearing working in conjunction with two of said rods. The bearing member sliding in contact with rods 86 and 87 is formed with a threaded bore to receive threaded screw 95, said screw 95 having a crank 96 secured to the outer free end thereof. The screw 95 has a section thereof adjacent said crank free of threads, said section positioned in a thrust bearing 97 which is rigidly secured to frame member 89. Connected to said chamber 76 is a conveyor guard rail 98 with a desired curved guide portion 99, said rail 98 is secured to plate 78 adjacent chamber 76 by bracket 106, said guide portion 99 is also rigidly supported by bracket member 101 rigidly secured to plate 78, said bracket 101 being slidably mounted in horizontal guide members 102 and 103 secured to conveyor frame 79. A substantially straight guide rail 104 is secured to said chamber 76 and extends toward said star wheel 44, said rail 104 is positioned on the opposite side of the conveyor from that of the bottle timing screw 60 and is rigidly supported by bracket members 107 and 108 secured to plate 78. The free end of said guide 104 is formed as shown in Figure 5 so that its end portion extends beneath said star wheel. Therefore, the free end of rail 104 extends close to the bottom of the pocket opening in star wheel 44 when large bottles are used. When the rail 104 is moved to narrow the bottle passageway on the conveyor, said rail 104 moves toward the discharge end of the conveyor as well as horizontally. This movement of the guide below the star wheel and below the pocket opening of said star wheel lessens the depth of the star wheel pocket for use with small bottles. This use of the guide rail 104 as described makes it possible that only one star wheel is required for any size bottle. Rigidly secured to the conveyor frame and adjacent the inlet end of the timing screw 60 is a curved bottle guide rail 110. Rails 99 and 110 have substantially the same contour and are arranged for guiding various size bottles as they are conveyed by the conveyor to the timing wheel. By turning crank 96 in a clockwise direction the plate 78, and everything secured thereto, moves toward the timing screw 60 in a horizontal plane. Due to the angular arrangement of the rods 84, said plate 78 moves slightly in a direction toward the star wheel 44. The reason for moving plate 78 with associated guide rails 99 and 104 is two-fold; in order that the same distance between the timing wheel 60 and the chamber 76 be maintained between the guide rails 99 and 104 it is necessary to move the plate 78 with rail 99 horizontally and angularly by the operation of the crank 96 since rails 99 and 110 are necessarily formed with suitable curve portions and said curve portions must be maintained at equal distances from each other. The angular arrangement of the rods 84 through 89 permits the bottle thrust pressure between the guide rails to be absorbed partially by the bearings sliding upon the rails thereby relieving the adjusting screw 95 from direct pressure upon its threads. This permits easy adjustment of the rails by the turning of crank 96 and prevents accidental movement of the rails due to normal operation of the conveyor.

Figure 6:
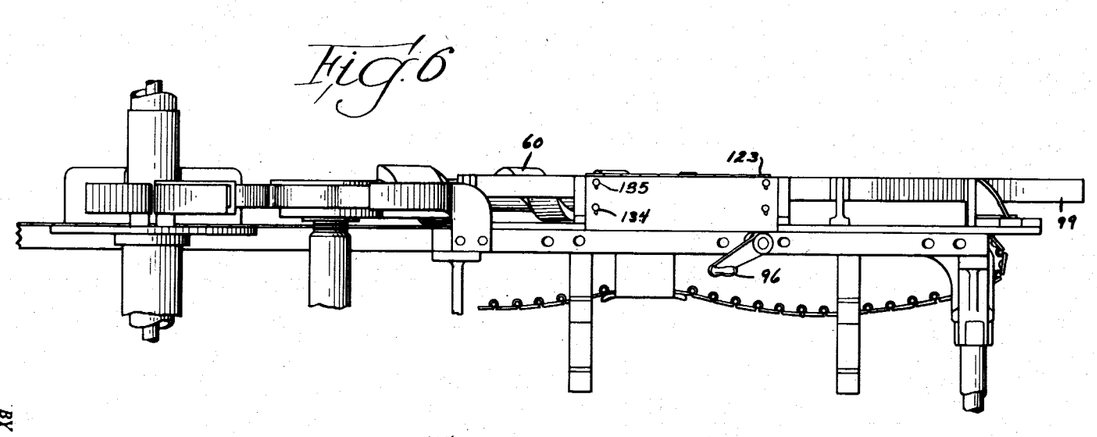
Figure 6 is a fragmentary rear view of the container handling apparatus shown in Figure 1.
Figure 7:
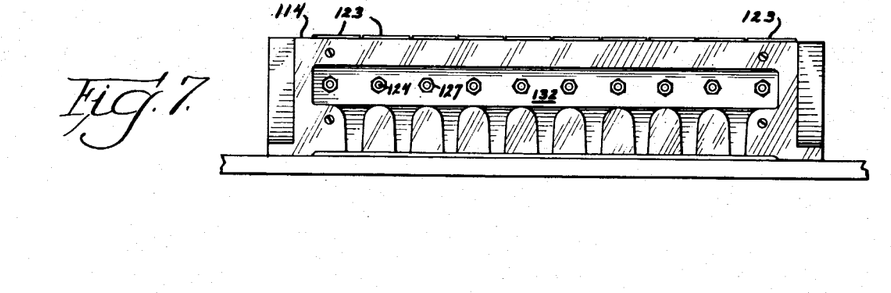
Figure 7 is a fragmentary, enlarged rear view of the adjustable guide-rail chamber embodying novel resilient plungers, the rear cover removed.
Figure 8:
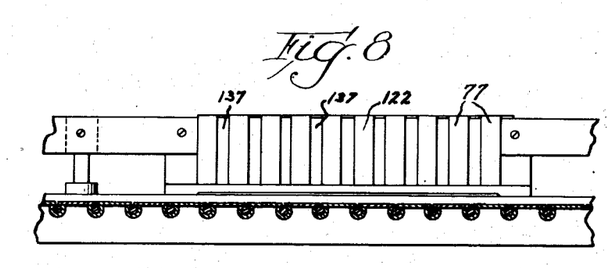
Figure 8 is a fragmentary front sectional view showing the adjustable guide-rail chamber and its resiliently mounted vertical surface plate members, taken substantially on line 8—8 of Figure 9.
Figure 9:
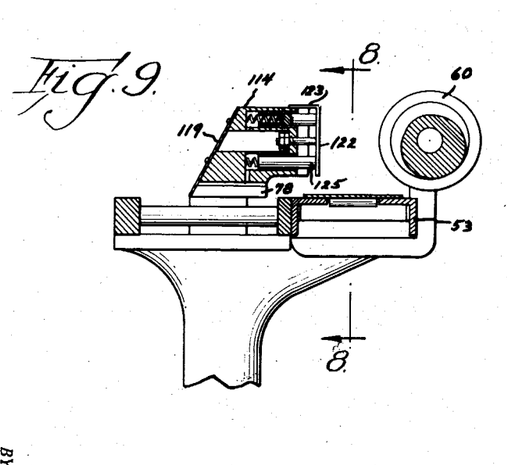
Figure 9 is a fragmentary sectional view showing the interior of the adjustable guide-rail chamber.
Figure 10:
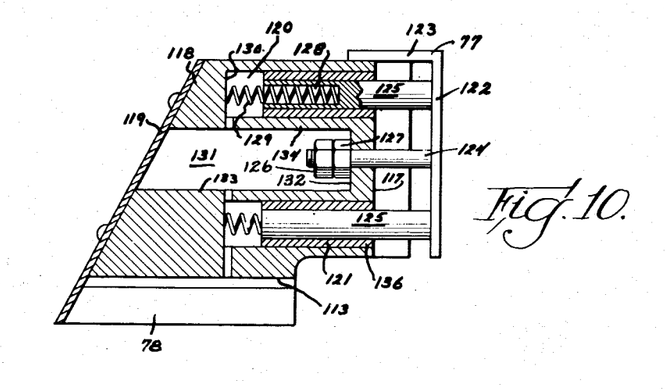
Figure 10 is an enlarged fragmentary view of the chamber shown in Figure 9.
Figure 11:
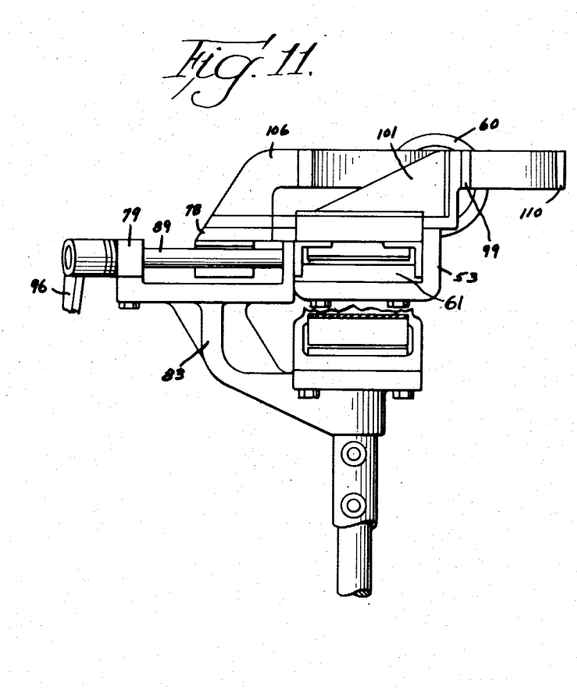
Figure 11 is an enlarged fragmentary end view of the conveyor shown in Figure 1.
Figure 12:
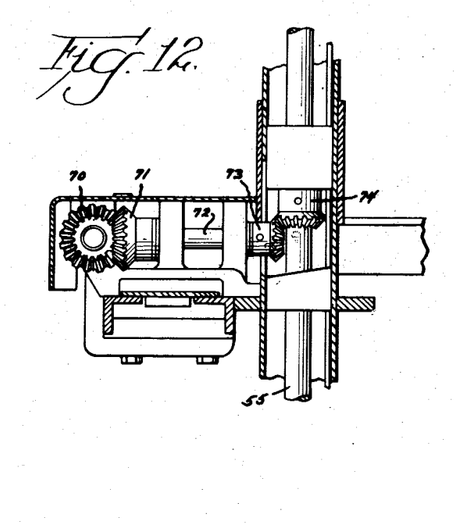
Figure 12 is a fragmentary vertical sectional view taken substantially on line 12—12 of Figure 4.
Figure 13:
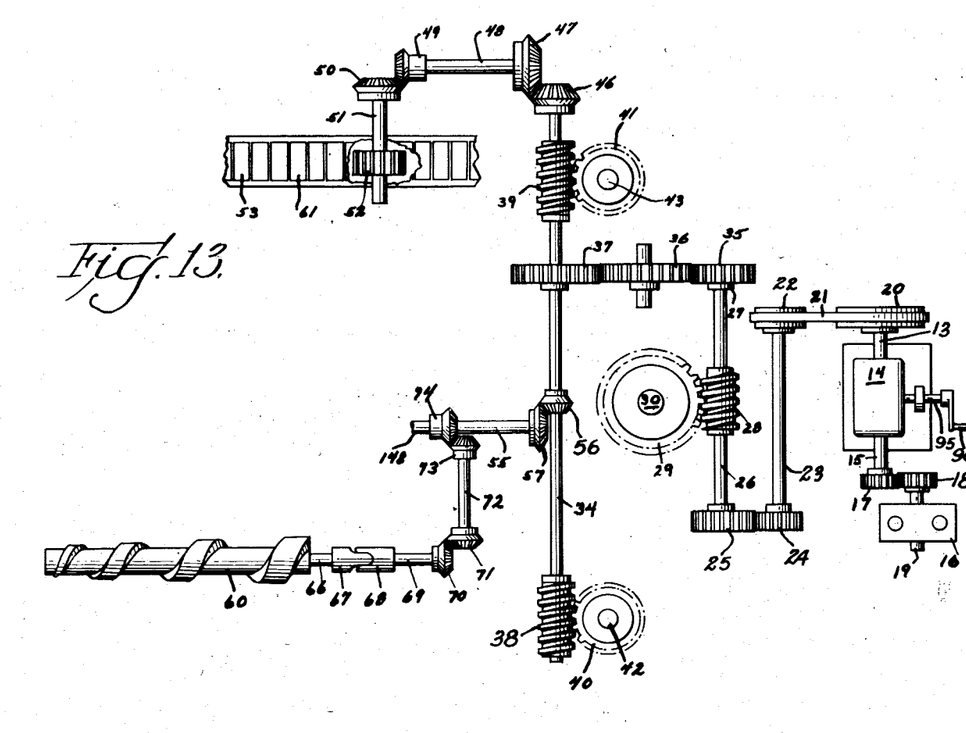
Figure 13 is a diagrammatic view showing the driving mechanism for the conveyor, the timing screw and for the associated parts of the machine.

To prevent jamming of the bottles in the conveyor, especially at the place at which successive bottles are first engaged by the timing screw 60, said series of ten independent members 77 is installed in chamber 76 opposite said timing screw. Said chamber 76 comprises a body 112 having a base 113, a top portion 114, end portions 115 and 116, a vertical front wall 117, and a slanting rear wall 118. Said front wall 117 is provided with twenty reamed holes 120 arranged horizontally therein, each hole 120 being provided with a bushing 121, as clearly shown in Figures 9 and 10. The ten independent fingers 77 each embody an integral vertical plate portion 122 and a horizontal top plate portion 123, with a horizontal stud screw 124 projecting rearwardly from said vertical plate 122. Said plate portions will be referred to as plates for convenience in this description. The free end of said stud screw 124 is provided with threads 126 and locking, or adjusting, nuts 127. Above and below each stud screw 124, and in vertical alignment therewith, is rigidly secured to each vertical plate 122 a sliding stud 125. Said sliding studs 125 have a hollow portion 128 in the rear end thereof; said studs sliding within cylindrical bushings 136. A compression spring 129 is positioned between each of said studs and the chamber. One end of said spring 129 is enclosed within said hollow bored portion 128 and with the opposite end of said spring 129 positioned against the rear wall 130 of reamed hole 120. The body 112 has a cavity or hollow cored out section 131 extending longitudinally therein and having a rear wall 132, bottom portion 133 and top portion 134. Each of said stud screws 124 extends through the wall 117 of body 112 and into said cavity or hollow section 131. The compression springs 129 within the hollow portion of each of the upper and lower sliding studs 125 attached to each independent member 77 force the vertical plates 122 outwardly away from said body 112. The stud screw 124 attached to vertical plate 122 is adjusted by having nuts 127 in locking engagement against wall 132 of section 131, thereby holding said member 77 resiliently in place. The slanting rear wall 118 of body 112 is provided with a plate 119 secured to said wall 118 by the combination of bayonet slots 134 and lock bolts 135 shown by Figure 6. If a jam of the bottles should form in the space between the timing screw 60 and the chamber 76 on the opposite side of the conveyor, one or more of the yieldable members 77 will yield under pressure from the bottles against the resistance of the springs 129 to efficiently break up the jam by allowing the jammed bottles to resume a single file order in the conveyor guideway between guides 99 and 110. Suitable means have been provided to prevent a jam should a bottle accidentally be overturned, consisting of the springs 129, which exert unequal pressure against the vertical plates 122. The springs behind the five plates 122 nearest the inlet guides 99 and 110 have less compression strength than the springs behind the five plates 122 nearest the outlet guide 104. The increased pressure behind said plates farthest from the inlet guides prevents an overturned bottle from being carried past the first five vertical plates 122. The vertical plates 122 are of less width than the horizontal plates 123 to provide an opening 137 between each vertical plate 122.

A curved inlet bottle guide 140 has been provided which extends from a point adjacent the discharge end of the bottle timing screw 60, around the star wheel 44, and to the nearest pedestal 141 associated with the pedestal carrier 31. A curved outlet bottle guide 142 has been provided which extends from a point adjacent a pedestal carrying a sealed bottle, around the outlet star wheel 45, to the conveyor at the opposite end thereof. A bottle guide plate 143 extends beneath the bottle guides 140 and 142 for supporting the bottles as they are moved from the conveyor to the pedestals and back to said conveyor by said star wheels 44 and 45. Said plate 143 and guides 140 and 142 are secured to and supported by suitable means connected to the vertical tubular housing 145 surrounding the vertical main shaft 30, said housing 145 connected to and supported by said housing 11 of the machine 10. The star wheel 44 and bottle guide 140 are made in a plurality of sizes as required for use with various size bottles. The star wheel 45 and bottle guide 142 are of a size which can be used for all size bottles. A bottle guide 146 is pivotally secured to bottle guide 142 for guiding bottles from the conveyor to any desirable outlet table.

Provision has been made for the accommodation of bottles of various size as stated above. The conveyor 53 is preferably of a width to accommodate a half-gallon round bottle for example, or the largest size bottle with which the machine is to be used, and the bottle timing screw permits the passage of a bottle of that size. When it is desirable to accommodate the machine to smaller bottles, the combined unit comprising the bottle guide rail 99, the chamber 76 and guide rail 104 is moved angularly toward the opposite side of the conveyor 53 by turning the crank 96 in a clockwise direction. Bottles of various sizes require that the machine be run at various speeds. Change in speed is easily accomplished by the operator turning the crank 58, which turns threaded shaft 59, and moves the motor 14 in a direction parallel to the direction of belt 21. Movement of the motor 14 in either direction will cause the speed ratio between pulley 20 and pulley 22 to change. Further, a change to the use of smaller bottles also requires a bottle timing-screw of a desired pitch to be placed adjacent the conveyor on bearings 62 and 66 in exchange for the timing-screw required for larger bottles.

A bottle advancing on the conveyor contacts the bottle timing screw 60 which performs a dual purpose, that is for smoothly moving and timing of the bottles and for the spacing of the bottles on the conveyor to the star wheel 44. In addition said screw serves to retain the bottles in upright position while moving along the conveyor, thereby to prevent their toppling over. Said screw 60 is driven by shaft 69 which receives its power from shafts 72, 55 and 34 through the intermediation of bevel gears 70, 71, 73, 74, 56 and 57. Said timing-screw 60 extends into the zone with the star wheel whereby the bottles are positively placed within the pockets of the star wheel.

Carried upon the upper portion of housing 11 is a cap feeder bracket welded thereon and supporting a tubular member 147 surrounding cap feeder shaft 148 connected to bevel gear 74; said member 147 supporting two magazines 157 and 158 for retaining the independent supplies of hood-type closures.

As the bottles pass from the timing-screw 60 into a pocket within the star wheel 44 and are moved forwardly by said star wheel, said bottles pass beneath a vertical chute 150 which retains a plurality of preformed closures where said closures remain until they are removed by a bottle passing thereunder. Thus each bottle passing beneath the chute 150 removes one closure suspended in the path of the head of the bottle. Thus the bottle to which the closure is applied moves with the star wheel and to the pedestal 141 so that the closure may be sealed to the bottle. Removal of the closures and application of a closure to the bottle has been shown and described in Patent 2,493,212 owned by assignee of this invention.

When the sealing of the closure upon the bottle is to be completed, the bottle with the closure applied thereto is moved by star wheel to the nearest pedestal as stated above. The main shaft 30 carries a supporting bracket 32 which can be raised or lowered by turning the crank 151 in the proper direction. Said bracket 32 carries a plurality of sealing heads 152. The sealing heads are constructed according to structure shown in applicant's Patent 2,544,626 issued March 6, 1951; said structure substantially the same and licensed under Patents 2,112,842 and 2,176,133. Said head 152 appearing in the drawing clearly shows the frusto-conically shaped member 153, the levers 154 and resilient extensible coil spring 155; said spring normally urges the upper portions of said levers 154 into contact with said cone shaped member 153. For guiding or centering the bottle and closure, a guide member 156 is employed in conjunction with said head 152 and removably secured thereto. A resilient rubber member within said head 152 conforms the closure to the bottle when the pedestal is raised. After the pedestal is lowered, said bottle passes to the star wheel 45 and thereafter to the discharge end of the conveyor 53. This completes the cycle of the sealing mechanism.

It is, of course, to be understood that the details of structure and arrangement of parts may be variously changed and modified without departing from the spirit and scope of this invention.

What we claim as new and desire to secure by Letters Patent, is:

1. In a device for spacing and delivering bottles to a machine for applying and sealing closures thereto, in combination a conveyor frame, a moving conveyor mounted on said frame, a curved fixed inlet guide-bar on one side of said conveyor frame, a revoluble timing-screw secured in suitable bearings fixed to said conveyor frame and on the same side of the conveyor frame as said curved fixed guide, a chamber with yielding pressure means positioned on the opposite side of the conveyor frame from said timing-screw, a movable curved guide-bar leading to said chamber and a straight guide-bar leading from said chamber side of said conveyor, said guide-bars and said chamber secured to a common movable member, said member movably mounted upon a plurality of angularly arranged horizontal supporting bars whereby said chamber and said guide-bars may be moved upon said supporting bars toward and away from said timing-screw in an angular direction, a hand crank for moving said common movable member whereby a common distance is maintained between said fixed curved guide-bar and said movable curved guide-bar, said timing-screw being in the form of a cone, enlarging toward the discharge end, and means for turning the timing-screw at a uniform speed, as specified.

2. In a device for spacing and delivering bottles to a machine for applying and sealing closures thereto, in combination a conveyor frame, a moving conveyor mounted on said frame, a curved fixed inlet guide-bar on one side of said conveyor frame, a revoluble spiral timing-screw secured in suitable bearings fixed to said conveyor frame and on the same side of the conveyor frame as said fixed guide, a chamber with yielding pressure means positioned on the opposite side of the conveyor frame from said spiral timing-screw, a curved movable guide-bar leading to said chamber and a straight guide-bar leading from said chamber on the same side of said conveyor frame, said guide-bars and said chamber secured to a common movable member, said member movably mounted upon a plurality of angularly arranged horizontal supporting bars whereby said chamber and said guide-bars may be moved upon said supporting bars toward and away from said timing-screw in an angular direction, a hand crank for moving said common movable member whereby a common distance is maintained between said fixed curved guide-bar and said movable curved guide-bar, said spiral timing-screw being in the form of a cone, enlarging toward the discharge end, and means for rotating the spiral timing-screw at a uniform speed, as and for the purposes set forth.

3. A machine for applying and sealing closures to bottles comprising a main base housing, said housing supporting a motor therein, a vacuum pump driven by said motor and supported within said housing, a rigid conveyor frame assembly positioned adjacent said housing, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a closure chute adapted to support a closure in position to be engaged by the top of a moving bottle, a closure applying means cooperating with the moving bottle top to cause the closure to be applied on the bottle top as the bottle moves past said closure applying means, a star wheel mounted adjacent said pedestal carrier and power driven by said main drive shaft, a moving conveyor supported by said conveyor frame for feeding filled bottles in spaced relation to said star wheel, said star wheel mounted on one side of the conveyor and a timing means mounted on the opposite side of said conveyor, a curved rigid guide rail extending to said timing means, said conveyor for receiving the filled bottles at random and for delivering said bottles one at a time to and from said timing means, said timing means including a horizontal timing-screw having trunnion bearings associated therewith for quick removal thereof, said timing-screw for intercepting filled bottles fed by the conveyor and equidistantly spacing the bottles for conveying engagement by said moving conveyor, a chamber mounted at one side of said conveyor opposite said timing-screw, a plurality of springs mounted within said chamber, a series of vertical, yieldable guiding plates spring mounted in the side of said chamber toward said timing-screw, a plurality of horizontal members extending horizontally within said chamber for supporting said plates, said horizontal members adjustable in relation to said chamber for changing the spring tension effecting said plates, said conveyor frame provided with a plurality of angularly arranged horizontal supporting members, a common movable member slidably mounted upon said horizontal supporting members, a curved guide rail extending to said chamber, a substantially straight guide rail extending from said chamber, said guide rails and said chamber secured to said common movable member whereby said chamber and guide rails may be moved toward and away from said timing-screw in an angular direction, and means for moving said member with said chamber and rails secured thereto.

4. A machine for applying and sealing closures to bottles comprising a main base housing, said housing supporting a motor therein, a vacuum pump driven by said motor and supported within said housing, a rigid conveyor frame assembly positioned adjacent said housing, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a vertical closure chute adapted to support a plurality of closures, one above the other with the lowermost closure in position to be engaged by the top of a moving bottle, a closure applying means cooperating with the moving bottle top to cause the closure to be applied on the bottle top as the bottle moves past said closure applying means, a star wheel mounted adjacent said pedestal carrier and power driven by said main drive shaft, a moving conveyor supported by said conveyor frame for feeding filled bottles in spaced relation to said star wheel, said star wheel mounted on one side of the conveyor and a timing means mounted on the opposite side of said conveyor, a curved rigid guide rail extending to said timing means, said conveyor for receiving the filled bottles at random and for delivering said bottles one at a time to and from said timing means, said timing means including a horizontal timing-screw having trunnion bearings associated therewith for quick removal thereof, said timing-screw for intercepting filled bottles fed by the conveyor and equidistantly spacing the bottles for conveying engagement by said moving conveyor, a chamber mounted at one side of said conveyor opposite said timing-screw, a plurality of springs mounted within said chamber, a series of vertical, yieldable guiding plates spring mounted in the side of said chamber toward said timing-screw, a plurality of horizontal members extending horizontally within said chamber for supporting said plates, said horizontal members adjustable in relation to said chamber for changing the spring tension effecting said plates, said conveyor frame provided with a plurality of angularly arranged horizontal supporting members, a common movable member slidably mounted upon said horizontal supporting members, a curved guide rail extending to said chamber, a substantially straight guide rail extending from said chamber, said guide rails and said chamber secured to said common movable member whereby said chamber and guide rails may be moved toward and away from said timing-screw in an angular direction, and a hand crank to be turned for moving said member with said chamber and rails secured thereto whereby a common distance is maintained between the curved guide rails, between the chamber and the timing-screw and between the substantially straight guide rail and the timing-screw.

5. A machine for applying and sealing closures to bottles comprising a main base housing, said housing supporting a motor therein, a vacuum pump driven by said motor and supported within said housing, a rigid conveyor frame assembly positioned adjacent said housing, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a closure chute adapted to support a closure in position to be engaged by the top of a moving bottle, closure applying means cooperating with the moving bottle top to cause the closure to be applied on the bottle top as the bottle moves past said closure applying means, a star wheel mounted adjacent said pedestal carrier and power driven by said main drive shaft, a moving conveyor supported by said conveyor frame for feeding filled bottles in spaced relation to said star wheel, said star wheel mounted on one side of the conveyor and a timing means mounted on the opposite side of said conveyor, a curved rigid guide rail extending to said timing means, said conveyor for receiving the filled bottles at random and for delivering said bottles one at a time to and from said timing means, said timing means including a horizontal timing-screw having trunnion bearings associated therewith for quick removal thereof, said timing-screw for intercepting filled bottles fed by the conveyor and equidistantly spacing the bottles for conveying engagement by said moving conveyor, a chamber mounted at one side of said conveyor opposite said timing-screw, a plurality of springs mounted within said chamber, a series of vertical, yieldable guiding plates spring mounted in the side of said chamber toward said timing-screw, said plates each embodying an integral vertical plate portion and a horizontal top plate portion with a horizontal supporting member projecting rearwardly from each of said vertical plate portions and extending horizontally within said chamber for supporting the same, said horizontal supporting members adjustable in relation to said chamber for changing the spring tension effecting said plates, said conveyor frame provided with a plurality of angularly arranged horizontal supporting members, a common movable member slidably mounted upon said horizontal supporting members, a curved guide rail extending to said chamber, a substantially straight guide rail extending from said chamber, said guide rails and said chamber secured to said common movable member whereby said chamber and guide rails may be moved toward and away from said timing-screw in an angular direction, and a hand crank and threaded shaft for moving said common movable member with said chamber and guide rails secured thereto whereby a common distance is maintained between the curved guide rails, between the chamber and the timing-screw and between the substantially straight guide rail and the timing-screw, and a second star wheel for moving said bottles from said movable pedestals to the discharge end of said moving conveyor, substantially as described.

6. A machine for applying and sealing closures to bottles comprising a main base housing, said housing supporting a motor therein, a vacuum pump driven by said motor and supported within said housing, a rigid conveyor frame assembly positioned adjacent said housing, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said heads to successively cooperate with the bottle heads and the closures thereon to squeeze and annularly contract the closures on the bottle heads into sealing condition, said pedestals and said heads arranged in common vertical alignment with one head positioned above each pedestal, means for causing the pedestals to ascend and descend from the carrier during rotation thereof, a magazine to retain a supply of preformed closures, a closure applying station embodying a vertical closure chute adapted to support a closure in position to be engaged by the top of a moving bottle, closure applying means cooperating with the moving bottle top to cause the closure to be applied on the bottle top as the bottle moves past said closure applying means, a star wheel mounted adjacent said pedestal carrier and power driven by said main drive shaft, a moving conveyor supported by said conveyor frame for feeding filled bottles in spaced relation to said star wheel, said star wheel mounted on one side of the conveyor and a timing means mounted on the opposite side of said conveyor, a curved rigid guide rail extending to said timing means, said conveyor for receiving the filled bottles at random and for delivering said bottles one at a time to and from said timing means, said timing means including a horizontal timing-screw having trunnion bearings associated therewith for quick removal thereof, said timing-screw for intercepting filled bottles fed by the conveyor and equidistantly spacing the bottles for conveying engagement by said moving conveyor, a chamber mounted at one side of said conveyor opposite said timing-screw, a plurality of springs mounted within said chamber, a series of vertical, yieldable guide plates spring mounted in the side of said chamber toward said timing-screw, said plates each embodying an integral horizontal top plate portion and a vertical plate portion, a horizontal supporting member projecting rearwardly from each of said vertical plate portions and extending horizontally within said chamber for supporting same, said horizontal members adjustable in relation to said chamber for changing the spring tension effecting the plates, said conveyor frame provided with a plurality of angularly arranged horizontal supporting members, a common movable member slidably mounted upon said horizontal supporting members, a curved guide rail extending to said chamber, a substantially straight guide rail extending from said chamber, said guide rails and said chamber secured to said common movable member whereby said chamber and guide rails may be moved toward and away from said timing-screw in an angular direction, and a hand crank and threaded shaft for moving said common movable member with said chamber and guide rails secured thereto whereby a common distance is maintained between the curved guide rails, between the chamber and the timing-screw and between the substantially straight guide rail and the timing-screw, and a second star wheel for moving said bottles from said movable pedestals to the discharge end of said moving conveyor, substantially as described.

7. A machine for applying and sealing closures to bottles, having in combination, a main base housing, said housing supporting a motor therein, means to change the speed of said motor, the speed of said motor governing the speed of all moving parts of said machine, a rigid conveyor frame assembly positioned adjacent said housing, a magazine to retain a supply of preformed closures, a closure applying station comprising a discharge chute associated with said magazine and common to the advancing succession of bottles and adapted to hold successive preformed closures in the path of successive bottle heads of said succession to be engaged thereby and removed therefrom with the closure on the bottle head, a plurality of movable closure sealing heads, a moving conveyor supported by said conveyor frame for feeding filled bottles in spaced relation to said movable closing heads, said heads corresponding to and advancing in a circular path with said series of bottles to successively cooperate with the bottle heads and the closures thereon to squeeze and annularly contract the closures on the bottle heads and hold them while advancing until deformed in sealed condition, a timing-screw mounted at one side of said conveyor, said conveyor for receiving the filled bottles at random and for delivering said bottles one at a time to and from said timing-screw, said timing-screw arranged in the form of a cone enlarging toward the discharge end, said timing-screw for equidistantly spacing the bottles for conveying engagement by said moving conveyor, a chamber mounted at one side of said conveyor opposite said timing-screw, a plurality of springs mounted within said chamber, a series of vertical, yieldable guiding plates spring mounted in the side of said chamber toward said timing-screw, a plurality of horizontal members extending horizontally within said chamber for supporting said plates, said horizontal members adjustable in relation to said chamber for changing the spring tension effecting said plates, said conveyor frame provided with a plurality of angularly arranged horizontal supporting members, a common movable member slidably mounted upon said horizontal supporting members, a curved guide rail extending to said timing-screw, a curved guide rail extending to said chamber, a substantially straight guide rail extending from said chamber, said guide rails and said chamber secured to said common movable member whereby said chamber and guide rails may be moved toward and away from said timing-screw in an angular direction, said outlet guide rail attached to said chamber and extending from said chamber in a direction toward and adjacent to said star wheel projects into the pocket opening of said star wheel to a greater extent as said guide rail is moved horizontally toward said timing-screw, said movement of said guide rail lessening the depth of the star wheel pocket to accommodate smaller bottles, and said timing-screw moving bottles to said star wheel which directs said bottles with closures applied thereon to said closure sealing heads, substantially as described.

8. A machine for applying and sealing closures to bottles comprising a main base housing, said housing supporting a motor therein, a vacuum pump driven by said motor and supported within said housing, a rigid conveyor frame assembly positioned adjacent said housing, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a closure chute adapted to support a closure in position to be engaged by the top of a moving bottle, closure applying means cooperating with the moving bottle top to cause the closure to be applied on the bottle top as the bottle moves past said closure applying means, a star wheel mounted adjacent said pedestal carrier and power driven by said main drive shaft, a moving conveyor supported by said conveyor frame for feeding filled bottles in spaced relation to said star wheel, said star wheel mounted on one side of the conveyor and a timing means mounted on the opposite side of said conveyor, a curved rigid guide rail extending to said timing means, said conveyor for receiving the filled bottles at random and for delivering said bottles one at a time to and from said timing means, said timing means including a horizontal timing-screw having trunnion bearings associated therewith for quick removal thereof, said timing-screw for intercepting filled bottles fed by the conveyor and equidistantly spacing the bottles for conveying engagement by said moving conveyor, a chamber mounted at one side of said conveyor opposite said timing-screw, a plurality of springs mounted within said chamber, a series of vertical, yieldable guide plates mounted in the side of said chamber toward said timing-screw, said plates each embodying an integral horizontal top plate portion and a vertical plate portion, the width of the surface area of the vertical plate portion being less than the width of the surface area of the horizontal portion, a horizontal supporting member projecting rearwardly from each of said vertical portions and extending within said chamber for supporting the same, said horizontal members adjustable in relation to said chamber for changing the spring tension effecting the plates, said conveyor frame provided with a plurality of angularly arranged horizontal supporting members, a common movable member slidably mounted upon said horizontal supporting members, a curved guide rail extending to said chamber, a substantially straight guide rail extending from said chamber, said guide rails and said chamber secured to said common movable member whereby said chamber and guide rails may be moved toward and away from said timing-screw in an angular direction, and a hand crank and threaded shaft for moving said common movable member with said chamber and guide rails secured thereto whereby a common distance is maintained between the curved guide rails, between the chamber and the timing-screw and between the substantially straight guide rail and the timing-screw, and a second star wheel for moving said bottles from said movable pedestals to the discharge end of said moving conveyor, substantially as described.

9. A machine for applying and sealing closures to bottles comprising a main base housing, said housing supporting a closure-retaining means with a supply of preformed closures therein, a closure-applying means, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a conveying and timing apparatus for delivering filled bottles to a star wheel, said conveying apparatus including a traveling conveyor, said timing apparatus including a rotatable timing-screw secured to one side of said conveyor and adapted to receive the filled bottles promiscuously, a chamber comprising a plurality of yielding members positioned on the opposite side of the conveyor from said timing-screw, said yielding members arranged side by side and having springs of unequal pressure in contact therewith, said yielding members forcing said bottles against said timing-screw, said timing-screw and said conveyor moving said bottles to said star wheel, said star wheel removing said bottles from said moving conveyor and directing said bottles with closures applied thereon to said pedestals and said closure sealing heads, substantially as described.

10. A machine for applying and sealing closures to bottles comprising a main base housing, said housing supporting a closure-retaining means with a supply of preformed closures therein, a closure-applying means, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a conveying and timing apparatus for delivering filled bottles to a star wheel, said conveying apparatus including a traveling conveyor, said timing apparatus including a rotatable timing-screw secured to one side of said conveyor and adapted to receive the filled bottles promiscuously, a chamber comprising a plurality of yielding members positioned on the opposite side of the conveyor from said timing-screw, said yielding members arranged side by side and having springs of unequal pressure in contact therewith, said yielding members forcing said bottles against said timing-screw, said yielding members being so constructed that a plurality of said members engages each bottle at the same time, said timing-screw and said conveyor moving said bottles to said star wheel, said star wheel removing said bottles from said moving conveyor and directing said bottles with closures applied thereon to said pedestals and said closure sealing heads, substantially as described.

11. A machine for applying and sealing closures to bottles comprising a main base housing, said housing supporting a closure-retaining means with a supply of preformed closures therein, a closure-applying means, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a conveying and timing apparatus for delivering filled bottles to a star wheel, said conveying apparatus including a traveling conveyor, said timing apparatus including a rotatable timing-screw secured to one side of said conveyor and adapted to receive the filled bottles promiscuously, a chamber comprising a plurality of yielding members positioned on the opposite side of the conveyor from said timing-screw, said yielding members arranged side by side and having springs of unequal pressure in contact therewith, said yielding members adapted to simultaneously engage said bottles at a plurality of points and force the same into contact with said rotating screw, said timing-screw having the delivery end thereof so shaped that said timing-screw operates to time the bottles by retarding the forward movement thereof through the movement of the conveyor and to actively force a bottle forward as it is delivered to said star wheel so as to insure the proper spacing of the delivered bottle from those following thereafter whereby said star wheel can get behind the delivered bottles without tilting or jostling the same, said star wheel moving said bottles with closures applied thereto to movable pedestals beneath said rotating closure sealing heads, a second star wheel for moving said bottles from said movable pedestals to the discharge end of said conveyor, substantially as described.

12. A machine for applying and sealing closures to bottles comprising a main base housing, said housing supporting a closure-retaining means with a supply of preformed closures therein, a closure-applying means, a rotatable vertical main drive shaft supported by said housing, a rotatable pedestal carrier supported by said shaft, a rotatable sealing head bracket supported by said shaft, said carrier and said bracket moving in unison, a plurality of pedestals supported by said carrier, a plurality of sealing heads supported by said bracket, said pedestals and said heads arranged in common vertical alignment with one head positioned above each pedestal, means for causing the pedestals to ascend and descend from the carrier during rotation thereof, a moving conveyor for feeding filled bottles in spaced relation to a power-driven star wheel mounted upon said base housing, said conveyor for receiving the filled bottles at random and for delivering said bottles one at a time to and from said timing means, said timing means including a horizontal timing-screw mounted on trunnion bearings for quick removal thereof, said timing-screw for intercepting said filled bottles fed by the conveyor and equidistantly spacing them for conveying engagement by said moving conveyor, a series of vertical, yieldable guiding plates mounted upon a movable chamber positioned at the side of the conveyor opposite said timing-screw to prevent jamming of said bottles at the inlet end of said timing-screw, a plurality of springs mounted with said chamber, said yieldable plates being spring-mounted upon a plurality of members extending horizontally into said movable chamber, said springs being of unequal pressure and arranged in contact with said plates, guide rails leading to and from said chamber, said chamber and guide rails mounted upon a movable member whereby said chamber and guide rails may be moved toward and away from said timing-screw, and said star wheel moving bottles from the discharge end of said timing-screw to said pedestals and said rotating sealing heads, substantially as described.

JOHN S. BOZEK.
HERMANN E. WEIDANZ.

References Cited in the file of this patent
UNITED STATES PATENTS

| Number | Name | Date |
|---|---|---|
| 1,649,267 | Tevander | Nov. 15, 1927 |
| 2,112,842 | Hogg | Apr. 5, 1938 |
| 2,176,133 | Hogg | Oct. 17, 1939 |
| 2,362,848 | Pearson | Nov. 14, 1944 |
| 2,385,882 | Rolker | Oct. 2, 1945 |
| 2,471,098 | Davies | May 24, 1949 |
| 2,493,212 | Zimmermann et al. | Jan. 3, 1950 |
| 2,510,568 | Fouse | June 6, 1950 |
| 2,544,626 | Zimmermann | Mar. 6, 1951 |